United States Patent [19]

Riederer et al.

[11] Patent Number: 4,551,800
[45] Date of Patent: Nov. 5, 1985

[54] INTEGRATED HYBRID IMAGE REMASKING IN A SUBTRACTION ANGIOGRAPHY METHOD

[75] Inventors: Stephen J. Riederer, Wauwatosa; Gary S. Keyes, Hartland, both of Wis.

[73] Assignee: General Electric Company, Schenectady, N.Y.

[21] Appl. No.: 444,954

[22] Filed: Nov. 26, 1982

[51] Int. Cl.[4] .................................................. G06F 15/42
[52] U.S. Cl. ....................................... 364/414; 378/99; 378/5; 378/62; 358/111
[58] Field of Search .................... 364/414; 378/99, 5, 378/62; 358/111

[56] References Cited

U.S. PATENT DOCUMENTS

| 4,204,225 | 5/1980 | Mistretta | 378/99 X |
| 4,204,226 | 5/1980 | Mistretta | 378/99 X |
| 4,335,427 | 6/1982 | Hunt et al. | 378/99 X |
| 4,355,331 | 10/1982 | Georges et al. | 358/111 |
| 4,367,490 | 1/1983 | Riderer | 378/99 X |
| 4,393,402 | 7/1983 | Keyes et al. | 378/99 |
| 4,430,749 | 2/1984 | Schardt | 364/414 X |
| 4,444,196 | 4/1984 | Stein | 358/111 X |

OTHER PUBLICATIONS

Computer Quantitation of Angiocardiographic Images; Brennecke et al., Non-Invasive Card. Meas. 9/78, pp. 17-20.
A Digital Video Image Processor for Real Time X-Ray Subtraction Imaging; Kruger et al., Optical Eng. vol. 17 #6, p. 652.

Primary Examiner—Jerry Smith
Assistant Examiner—Louis Woo
Attorney, Agent, or Firm—Fuller, House & Hohenfeldt

[57] ABSTRACT

In a subtraction angiography hybrid difference images are generated and reviewed visually. Hybrid images that exhibit no x-ray contrast medium and are free of artifacts are identified and selected for forming an integrated mask image. Hybrid images that exhibit contrast medium and are free of artifacts are identified and selected for forming an integrated contrast medium image. The selected images that exhibit no contrast medium are integrated and those that exhibit contrast medium are integrated separately. The result of one integration is subtracted from the other to yield a single final image that exhibits substantially only the contrast medium in a blood vessel. In an alternate method temporal difference images are reviewed and a similar selection of some that exhibit no contrast medium and some that exhibit contrast medium is made. These images are separately integrated and subtracted to yield a single final image that exhibits substantially only contrast medium in the blood vessel.

12 Claims, 10 Drawing Figures

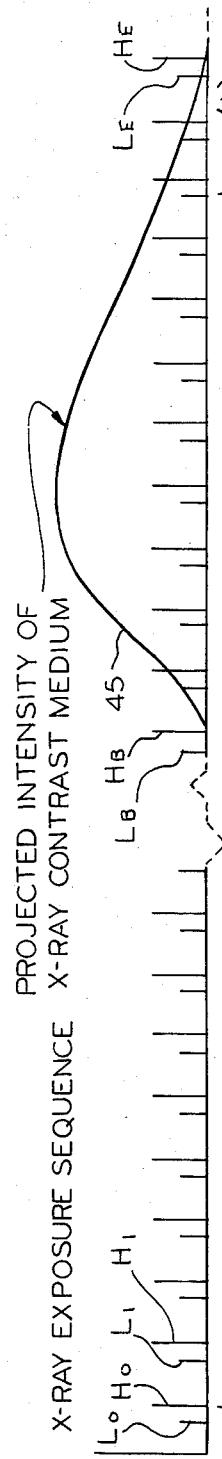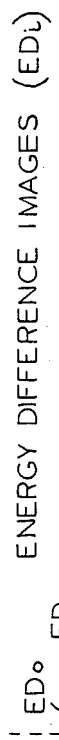

INTEGRATED HYBRID IMAGE REMASKING IN A SUBTRACTION ANGIOGRAPHY METHOD

BACKGROUND OF THE INVENTION

The invention relates to the field of digital subtraction angiography. The invention disclosed herein pertains to methods and apparatus for performing temporal and hybrid subtraction of x-ray images which results in improved signal-to-noise ratio.

The new hybrid subtraction method and apparatus are used in an x-ray procedure wherein the interior configuration of a blood vessel is delineated by having an x-ray contrast medium flowing through the vessel in the course of obtaining a sequence of x-ray images of the vessel.

The basic hybrid subtraction method and apparatus for performing the same are described in pending patent application Ser. No. 260,694, filed May 5, 1981 wherein W. R. Brody is the inventor. Hybrid subtraction involves a combination of temporal subtraction and energy subtraction methods.

Temporal subtraction is one well-known procedure for enhancing visualization of blood vessels to the exclusion of surrounding soft tissue and bony structures. In temporal subtraction, an x-ray image of the blood vessel of interest in the body is acquired just before an opaque x-ray contrast medium, such as an iodinated compound, that has been injected in the circulatory system arrives in the vessel. This is called a pre-contrast mask image and it contains the vessels and usually a background of soft tissue and bony structures. The pre-contrast image is usually digitized and the digital data representations of the picture elements (pixels) in the image are placed in a digital frame memory. When the contrast medium reaches the vessel of interest, an x-ray image is made and converted to digital data. The mask or pre-contrast image data are then subtracted from the post-contrast image data to cancel or subtract out all soft tissue and bony structure and anything that is common to both images to thereby enhance visualization of the blood vessel that contains the contrast medium. Usually the x-ray tube current and applied kilovoltages are the same for the pre-contrast and post-contrast images. The method is called temporal subtraction because of the substantial time lapse between the pre-contrast and post-contrast images. As is known, the pre-contrast mask images and post-contrast images will always have some noise content that is introduced by the x-ray system and the electronic components that are used to generate and process the signals that represent the images.

Temporal subtraction provides high signal-to-noise ratio (SNR) and is a preferred procedure in cases where there is little if any movement of soft tissue during the interval between acquisition of the pre-contrast and post-contrast images. However, when there is tissue motion there must necessarily be information that is not common to successive images. This results in a motion artifact which obscures the contrast of the contrast medium-filled vessel. Tissue movement is likely to exist in abdominal vessel studies wherein peristalsis of the digestive organs moves the vessels. Renal artery studies are often adversely affected. Movement is also exhibited in carotid artery studies where the swallowing reflex causes an artifact which can obscure visualization of the vessels of interest.

Another image subtraction procedure is characterized as energy subtraction. Energy subtraction is based on the fact that x-ray attenuation by a body or any material is an x-ray energy dependent phenomenon and that the energy dependence is different for materials having different atomic number averages. In energy subtraction, an x-ray image of a region of interest in the body is obtained with a nominally low kilovoltage (kV) applied to the x-ray tube so the x-ray beam projected through the body has an average spectral distribution within a band having a low average energy. After a low average energy image is obtained and digitized, at least one more image is obtained with a comparatively higher kV applied to the x-ray tube and a resulting higher average energy spectral band. For angiographic studies, the two images are obtained when there is an x-ray contrast medium such as an iodinated compound present in the vessels. In any case, the high average energy image pixel data are subtracted from the low average energy pixel data and a difference image remains. Prior to subtraction, the data are usually variously weighted or scaled to bring about cancellation of soft tissue. The data could be scaled to eliminate bone from the difference image instead of tissue. However, it is not possible to remove or cancel bony structures without also removing most of the contrast medium which is really what one is trying to visualize in angiographic studies since it defines the interior shape of the vessel.

There are also brightness nonuniformities in the subtracted or difference images due to several effects when the image data are acquired using an image intensifier that is coupled to a television camera. Veiling glare, which is like haze, results from light diffusion or scattering often present in the input or output phosphors of the image intensifier. The fact that rays of a broad x-ray beam are scattered by body tissue in an energy dependent manner between ray paths also causes loss of contrast in the difference image. Differential detection of x-rays at various energies in the input phosphor of the image intensifier leads to additional brightness nonuniformities. None of these phenomena can be completely nullified by energy subtraction alone.

Hybrid subtraction has been proposed for cancelling or subtracting out stationary bone and soft tissue and for elimination of artifacts due to soft tissue movement while still providing an image of the contrast medium-filled vessel. In hybrid subtraction, x-ray images are obtained using two x-ray spectra having different average energies and are combined in a manner to suppress signals due to soft tissue in a heterogeneous object such as the body. Basically, in one known hybrid subtraction procedure, a mask image is obtained first by projecting a low average energy x-ray beam (hereafter called low energy beam or low energy spectral band), through the body followed by a higher average energy x-ray beam (hereafter called high energy beam or high energy spectral band) when the injected x-ray contrast medium has not yet arrived in the blood vessel. The images, exhibiting primarily bone and soft tissue, acquired at two x-ray energies are scaled and weighted using appropriate constants and then subtracted to produce a mask image in which signals due to soft tissue variations are suppressed or cancelled and bony structures remain. The data for a pair of high and low energy x-ray images are next obtained after the injected contrast medium reaches the vessel in the region of interest. The data for this pair of images are acted upon, respectively, by the same constant weighting factors that are used with the first pair of pre-contrast medium images to cancel soft tissue and let bone and the contrast medium remain. One image acquired in this post-contrast medium exposure pair is subtracted from the other such that the resulting post-contrast difference image data contains data representative of the bone structures plus vessels containing contrast medium. The final step in hybrid subtraction is to subtract the dual energy post-contrast difference image from the dual energy pre-contrast difference image to effect the equivalent of temporal subtraction and thereby suppress or cancel the bone structures and isolate the contrast medium containing vessels. A major advantage of hybrid subtraction over temporal subtraction alone is the reduced sensitivity to soft tissue motion artifacts because the soft tissue is suppressed or cancelled in the pre-contrast and post-contrast dual energy images. Hybrid subtraction is superior for eliminating soft tissue structures that may have moved during the time between the mask image and post-contrast image or images. However, if there is no tissue movement, ordinary temporal subtraction is preferred because of its better signal-to-noise ratio compared to hybrid subtraction.

Another hybrid subtraction method has been reduced to the point of practical application by one of the inventors named herein. In this method, a sequence of pairs of low and high x-ray energy exposures are made over an interval comprised of a pre-contrast period when the contrast medium has not yet arrived in the vessel of interest, and a post-contrast period during which a substantial concentration of x-ray contrast medium has arrived and is flowing through the vessel, and an after-post-contrast period when substantially all of the contrast medium has departed from the vessel of interest. Usually, two to five but possibly as many as fifteen high and low x-ray energy exposure pairs are obtained per second. The x-ray images are converted to optical images with an image intensifier. A television camera converts the optical images to analog video signals. The analog video signals for each image frame are converted to digitally represented pixels. In the preferred one of several different available modes, the first low energy image frame data are used as mask image data. It is stored and all subsequent low energy image frame data in the exposure pairs are subtracted from the low energy mask image data to produce a series of low energy temporal difference images data which are stored on magnetic disk. The first high energy exposure in the sequence is also treated as a mask and all subsequent high energy exposure image frames are subtracted from the high energy mask alternatingly with the low energy subtractions and the resulting high energy difference images are stored alternately with the low energy images on magnetic disk. In the preferred procedure among those proposed by said inventor, the series of low energy temporal difference images and the series of high energy temporal difference images are accessed from the disk memory and are subjected to matched filtering wherein the data are multiplied by matched filter coefficients to emphasize the contrast medium signal of interest and filter out noise and other artifacts. The low and high matched filtered temporal difference images are then summed independently. The summation of the low energy filtered temporal difference image data are multiplied by a weighting constant, $k_L$, and the summed high energy filtered temporal difference image data are multiplied by a weighting constant, $k_H$. The constants are selected to bring about cancellation of anything that did not remain constant throughout the sequence of images and let the digital pixel data representative of the contrast medium filled vessel remain. After these multiplications are performed, the summed low and high energy image data are subtracted in what is called an energy subtraction step which results in a single frame of data wherein only pixel data representative of the shape of the contrast medium in the vessel remains. The advantage of the matched filtering approach is a substantial reduction in noise of the hybrid image. The invention described herein, characterized as integrated remasking, can also significantly reduce the noise in either temporal or hybrid subtraction. It additionally has the advantage of requiring somewhat less complex circuitry than matched filtering.

SUMMARY OF THE INVENTION

In accordance with one embodiment of the invention, a sequence of alternate low and high x-ray energy exposure pairs are made over an extended interval including a pre-contrast period before arrival of the contrast medium in the vessel, and the ensuing post-contrast period when the contrast medium is present in the vessel, and into an after-post-contrast period when the contrast medium has substantially departed from the vessel. The first low x-ray energy frame or data representing the image frame is used as a low energy mask image. The frame data for the first high energy exposure in the first pair of exposures are used as the high energy mask. These data are stored. Then all subsequent low energy frames data are subtracted from the mask and the data for the resulting series of temporal difference images are stored on magnetic disk. Likewise, as the alternating high energy exposures occur, their data are subtracted from the high energy mask and the resulting series of high energy temporal difference images data are stored alternatingly with the series of low energy temporal difference images on disk. Next, successive pairs of low temporal difference images data and high energy temporal difference images data are accessed from disk storage and subjected to weighting and energy subtraction to thereby produce a succession of first order hybrid subtraction image data frames. The succession of hybrid images are displayed one after another on a television monitor and each is reviewed by the operator. Each hybrid image has an identifying number which is displayed on the television screen with it. As the operator reviews the succession of pre-contrast, post-contrast and after-post-contrast first order hybrid images, the operator can easily visualize and segregate images which may have artifacts due to bone movement or other causes from those which do not have such defects. The operator classifies the images into three groups: usable non-contrast images, usable post-contrast images and rejected defective images. The non-contrast images are generally comprised of either pre-contrast or after-post-contrast images which contain little or no contrast medium and are suitable for use as a mask. The information identifying the various hybrid images as good non-contrast or post-contrast images or reject images is held in an identifier look-up table. Several if not all of the pre-contrast image frames and possibly other non-contrast containing images including after-post-contrast images will be used to form a new mask image for the integrated remasking process, in accordance with the invention. The good post-contrast images will be integrated to form an image that will later have the new integrated mask image that exhibits no contrast medium subtracted from it to produce the data that will ultimately represent the final reprocessed hybrid subtraction image. After the first order hybrid images are reviewed and classified, the series of related low and high temporal difference image pairs are accessed again from disk storage for use on a selective basis, that is, only those pairs of low and high energy temporal difference image frames which made up a useful hybrid image that was discovered in the previous review are selected for integration under the control of the identifier look-up table. The successive pairs of usable low and high temporal difference images are then multiplied by weighting constants $k_L$ and $k_H$, respectively, to form the successive first order hybrid image frames again. These first order hybrid images data are then sent to two different circuits each of which has a switch at its input. The switches may be comprised of a multiplexer. The succession of selected images containing no contrast medium, called the non-contrast hybrid images data are then fed to one of the circuits and the selected post-contrast hybrid images data are fed to the other circuit. One of the circuits then integrates the selected non-contrast hybrid images and the other circuit integrates the selected post-contrast hybrid images. There may be different numbers of non-contrast and post-contrast hybrid difference images selected. The integrated image data are scaled or normalized so that their average brightness or intensity is the same. After normalizing, the integrated non-contrast image data are used as a new mask or remask and the integrated or summed post-contrast image data has the mask image data subtracted from it to thereby yield a final hybrid subtraction image data set containing only data representative of the contrast medium in the blood vessel. This data set, presently in digital form, has gain and offset applied and is converted to analog video signals in a digital-to-analog converter for permitting the final hybrid subtraction image to be displayed on the television monitor.

The remasking process, in accordance with the invention, can also be carried out in a different order than in the mode just outlined. The alternative procedure involves acquisition of a series of energy subtracted frames of data during the pre-contrast, post-contrast and possibly the after-post-contrast periods. These energy subtracted images are stored on disk as they are acquired. In a reprocessing procedure, the operator displays the successive energy subtracted images on the television monitor and identifies or classifies them in accordance with whether they are suitable for forming remasked hybrid images. The selected energy subtracted images are then accessed again from disk and the selected pre-contrast images data are integrated to form a new contrast-medium free mask and the selected post-contrast images are integrated to form a new post-contrast image. After scaling as previously described, the integrated remasked data is subtracted from the integrated post-contrast data to perform the equivalent of temporal subtraction. The resulting hybrid difference image data set then contains only the data representative of the contrast medium and the data can be used to display the image on a television monitor.

In another integrated remasking mode described herein only the sequence of x-ray images produced with the same average energy x-ray beams are used for remasking in connection with a temporal subtraction procedure. The data representing the image resulting from the first exposure are used as the mask image data. The mask image data are subtracted from all subsequent pre-contrast, post-contrast and after-post-contrast exposures data as they are acquired to thereby yield a series of temporal difference image data sets which are stored on disk. These temporal difference images are reviewed one by one as in the former cases. Artifact-free pre-contrast temporal difference images are selected for being integrated to form a single set of data constituting a new mask. Selected artifact-free post-contrast temporal difference images are integrated to form a single set of data representing the post-contrast image. The two data sets are normalized if they contain unequal numbers of images and are then subtracted from each other to form a final remasked temporally subtracted image data set. In another mode, hybrid images data are formed and stored concurrently with acquisition of the exposure data and these are reviewed classified and integrated into noncontrast mask and post-contrast data sets. In still other modes, where there is no other hybrid image formed or where there is, the new unsubtracted exposure data are put in storage and subsequently reprocessed for review, classification and integrated remasking.

A detailed description of the integrated remasking method and suitable apparatus for performing the method will now be set forth in reference to the drawings.

DESCRIPTION OF THE DRAWINGS

FIG. 1 is a diagram for facilitating describing how the sequence of alternate low and high x-ray energy exposures are made over a pre-contrast period, a post-contrast period and an after-post-contrast period to obtain the data for obtaining a hybrid subtraction image;

FIG. 2 is for illustrating how temporal difference images are formed during image acquisition in one of the operating modes wherein temporal difference images are acquired and stored as a first step which is followed by hybrid difference image formation, review of these images, selection of images free of artifacts, remasking and formation of the final hybrid image;

FIG. 3 is a diagram for facilitating discussion of the timing governing the hybrid difference images for review;

FIG. 4 is a timing diagram that can be considered in conjunction with FIG. 1 and is for facilitating description of the mode of operation wherein energy difference images are acquired as the first step and stored for subsequent review, classification, integration or forming a new pre-contrast integrated mask and a post-contrast integrated image that lays the basis for performing hybrid substraction;

DESCRIPTION OF A PREFERRED EBODIMENT

Figure 5:
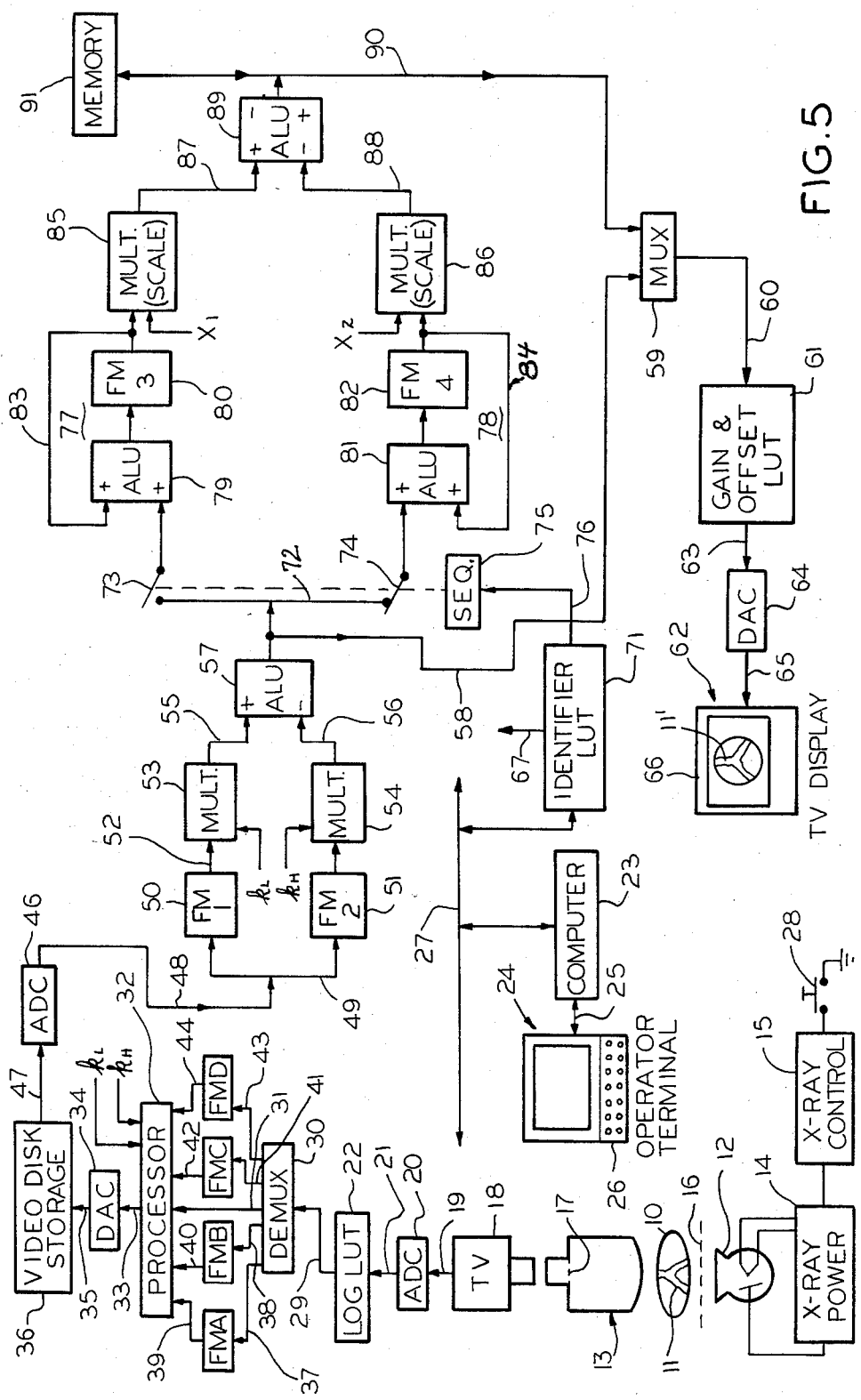
FIG. 5 is a block diagram of the hardware for conducting either of two integrated remasked hybrid subtraction modes and also a temporal subtraction remasking mode.

Refer first to FIG. 5 for a preliminary review of the x-ray apparatus used for making the low and high energy x-ray exposures for an angiographic examination in accordance with any of the integrated remasking modes described herein. In the left region of FIG. 5 the patient undergoing examination is represented by the ellipse marked 10. A blood vessel of interest is marked 11. An x-ray tube 12 is located on one side of the patient and an x-ray image intensifier 13 is located on the other side. The x-ray tube power supply is represented by the block marked 14 and the control for the power supply is marked 15. X-ray control 15 has the capability of switching the power supply so it will apply alternating relatively low kilovoltage, such as in the range of 65-85 kilovolts peak (kVp) between the anode and cathode of the x-ray tube 12 for short exposure intervals on the order of a television frame time and relatively higher applied kVp such as in the range of 125-135 kVp for the high energy exposures. The low energy beam is desirably filtered to remove x-ray photons having such low energy that they would not penetrate through the body but would be absorbed. Thus, an aluminum filter, indicated by the dashed line 16 can be used in the low energy x-ray beams. During the high energy x-ray beams, a filter 16 that removes radiation substantially below the peak of the high average energy spectrum is inserted synchronously. Copper is a suitable filter material for the high energy beam and it can be inserted while the aluminum filter remains in the beam.

The low and high kilovoltages are applied alternatingly during an entire exposure sequence. The low energy exposures are followed as quickly as possible by the high energy exposures throughout the sequence. Generally from one to six pairs of exposures may be made per second throughout the exposure sequence. The high voltage or high x-ray energy exposures in the pairs could precede the low voltage or low energy exposures if desired. The only requirement is that there be alternating low and high energy or high and low energy exposures in a sequence.

When the low and high kilovoltages are applied to the anode of the x-ray tube 12 the resulting x-ray beams are not composed of corresponding monoenergetic x-ray photons but there is a distribution of energies within a spectral band which has an average energy. Hence, for convenience the relatively low and high average energy exposures will simply be called low and high energy exposures herein and the corresponding images will be called low and high energy images.

In FIG. 5, the x-ray images resulting from projecting alternate low and high energy x-ray beams through the patient are converted to optical images which appear on the output phosphor 17 of the image intensifier tube 13. A television (TV) camera 18 converts each image frame to analog video signals which are transmitted by way of a line 19 to an analog-to-digital converter (ADC) 20. ADC 20 converts the analog video signals to digital pixel signals, usually ten bits wide, whose values correspond to the intensity of the picture elements (pixels) that compose an image frame. The digitized pixels are input by way of a bus 21 to a block 22 that is also labelled log LUT and represents a logarithm look-up table in which the digital pixel values are converted to corresponding logarithmic values and are also amplified. Although it is believed preferable to convert the digital pixel values to their logarithmic values, such conversion is not absolutely necessary since the signals can be processed in their linear form if desired.

The FIG. 5 apparatus is controlled and timed by a computer which is designated by the block marked 23. An operator's terminal 24 is shown coupled to the computer by means of a bidirectional bus 25. The operator terminal has a keyboard 26 which is used by the operator to perform various functions in the system. A fragment of a single bus 27 is representative of the data and control buses of the computer 23. It will be understood that the various components shown in block form in FIG. 5 will be connected to the bus 27 to produce automatic and operator induced control over functions of the system hardware in FIG. 5. The entire bus system is not shown for the sake of brevity. A hand switch 28 is used by the operator to initiate a sequence of alternate low and high energy x-ray exposures.

In FIG. 5, the logarithmic pixel data representing the low energy and high energy exposure frames are conducted by means of a bus 29 to a demultiplexer (DEMUX) represented by the block marked 30. One ouput bus 31 from the DEMUX 30 is one input to a processor represented by the block marked 32. The functions of the processor will be discussed later. For the time being it is sufficient to recognize that the digitized and, possibly otherwise processed data representing the low and high exposure image frames are fed by way of a bus 33 to a digital-to-analog converter (DAC) represented by the block marked 34. DAC 34 converts the image data for each frame to analog video signals again and these signals are conducted by way of a cable 35 to a video disk storage device 36 which stores the signals in analog form. If a digital video disk storage device is available that can accept pixel data at a high enough rate, the DAC 34 can be eliminated. There are four other output buses 37, 38, 41 and 43 from DEMUX 30. These buses lead respectively to frame memories FMA, FMB, FMC and FMD. These frame memories are used in one of the hybrid subtraction modes to be described. Their output buses 39, 40, 42 and 44 are inputs to processor 32.

Now that the elementary hardware for obtaining a sequence of low energy and high energy images data have been outlined, the nature of the sequence of the high and low energy images will be discussed. Attention is invited to FIG. 1 which is applicable to all modes of performing integrated remasked hybrid subtraction described herein and to integrated remasked temporal subtraction as well.

The first mode to be described is one wherein temporal difference images are acquired and stored and subjected to reprocessing in connection with performing the integrated remasking method. In FIG. 1, the first low energy x-ray exposure is identified as $L_0$ and the first high energy exposure in the closely successive pair of exposures is identified as $H_0$. For the mode now being described, the image data corresponding to the first low energy exposure, $L_0$, is treated as the low energy mask image data and the data for the first high x-ray energy exposure, $H_0$, is treated as the high mask image data. These mask data sets are stored, respectively, in frame memories FMA and FMB. When the next low energy exposure $L_1$ occurs, its data is fed through DEMUX 30 in FIG. 5 to processor 32 wherein mask image data, $L_0$, is subtracted from the subsequent low energy exposure data $L_1$. The difference image data that results from this subtraction is called the temporal difference image data. This temporal difference image data is stored on one of the tracks of video disk 36. Likewise, when the next high energy exposure, $H_1$, occurs, the high energy mask data $H_0$ is subtracted from it and the resulting high energy temporal difference image data is stored on another track of video disk 36. Similarly, the data for all subsequent low energy exposures in the sequence have the low energy mask image data, $L_0$, subtracted from them and the difference image in each case is stored on a separate track on the disk. Alternatingly, the data for every high energy exposure starting with $H_1$ and going through the entire exposure sequence has the mask data $H_0$ subtracted from it and the resulting high energy temporal difference images are stored on separate tracks of the disk. Up to the time that the image pair comprised of low energy image $L_B$ and high energy image $H_B$ are acquired no contrast medium has reached the blood vessel of interest as yet so this can be called the precontrast period and is one of the two no-contrast periods, the other being the after-post-contrast period. It is assumed that during the pre-contrast period from $L_0$, $H_0$ to $L_B$, $H_B$ contrast medium has been flowing from its previously injected site in the circulatory system toward the vessel of interest. Immediately after images $L_B$ and $H_B$ are acquired, the x-ray contrast medium enters the blood vessel of interest. Its projected intensity or concentration relative to time is indicated by the curve marked 45. Usually the contrast medium resides in the vessel of interest in significant amounts for a period of about five to ten seconds. The acquisition of the sequence of low and high energy image pairs is continued at the same rate or optionally a different rate throughout the period between $L_B$, $H_B$ and $L_E$, $H_E$ when the contrast medium substantially exits the vessel. Then, several more pairs of low and high energy exposures may be made in the after post-contrast period, that is, after the contrast medium has substantially exited and this is another no-contrast medium present period.

FIG. 2 illustrates the series of temporal difference images (TD$_i$) pairs that are formed and stored on disk. The first one, TD$_{1,L}$, resulted from subtracting the mask image data, $L_0$, from the first pre-contrast exposure image data $L_1$. The next temporal difference image TD$_{1,H}$ resulted from subtracting the image data for the mask image $H_0$ from the first high energy exposure data $H_1$. This repeats all the way to the last pair of stored low and high temporal difference images in the sequence which are marked TD$_{N,L}$ and TD$_{N,H}$ where TD stands for temporal difference image and which result from subtracting the low and high energy masks from the last two exposures in the sequence whether the last two have occurred in the post-contrast period or later in the after-post-contrast period. It will now be evident that there are a series of high and low energy temporal difference images as in FIG. 2 stored on video disk 36.

At this time the operator does not know whether all of the temporal difference images are sufficiently free from artifacts caused by tissue movement and other causes. Additionally he may not wish to integrate images even if they are free from artifacts because he wishes to preserve temporal resolution. In accordance with the invention, the suitability of the hybrid difference images is determined by forming the high and low temporal difference images into a sequence of first order hybrid difference images. What the operator must do is display and review the successive first order hybrid images for artifacts and misregistration defects. In accordance with the invention, the operator then selects or identifies all of the pre-contrast images and, if desired, after-post-contrast or no-contrast images which are suitable for use later in integrated remasking reprocessing, which is to be described, and the operator similarly identifies and selects the usable post-contrast hybrid difference images that might be used later in integrated remasking reprocessing.

The first thing to do is form the series of first order hybrid difference images for review of each consecutively as they are formed on the television monitor screen 66 so the operator can make the selection or classify them as to whether they are candidates for an integrated noncontrast medium containing mask or an integrated postcontrast image or whether they should be rejected. Temporal difference images TD$_{1,L}$ and TD$_{1,H}$ in FIG. 2 are used to make the first hybrid difference image. Using the keyboard 26 on the operator terminal, the operator will bring about access of temporal difference images TD$_{1,L}$ and TD$_{1,H}$ from disk storage 36. In this embodiment, where the low and high energy temporal difference images are stored as analog signals on disk, the image data is again digitized on a frame-by-frame basis in ADC 46 in FIG. 5 which is supplied from disk by way of a cable 47. The digital data representative of each low and each high energy temporal difference image frame are conducted by way of bus 48 to alternate destinations by way of a branch bus 49. A low energy temporal difference image is entered into a full frame digital memory labelled FM1 and marked 50. A high energy temporal difference image data in a pair are entered into a frame memory FM2 which is also marked 51. These frame memories FM1 and FM2 are the input components of circuits in which energy subtraction will be performed to produce a succession of hybrid difference images extending over the whole exposure sequence. FIG. 3 shows that there is a hybrid difference image (hD$_i$) resulting from each pair comprised of a low energy and a high energy temporal difference image as shown in FIG. 2.

In FIG. 5, when the successive low and high temporal difference image data comprising a pair have been loaded in memories FM1 and FM2, respectively, they are separately multiplied by respective weighting coefficients $k_L$ and $k_H$. The low energy temporal difference image data are fed by way of a bus 52 to a multiplier (MULT) represented by the block marked 53. These data are then multiplied in MULT 53 by the weighting coefficient $k_L$. Similarly, simultaneously, the high energy temporal difference image data are multipied in a MULT 54 by weighting coefficient $k_H$. The weighted low energy temporal difference image data and the high energy temporal difference image data are then fed by way of buses 55 and 56, respectively, to an arithmetic logic unit (ALU) 57. Here the weighted high and low energy temporal difference image data are subtracted from each other to effect energy subtraction to cancel any soft tissue motion residuals that were not cancelled by prior temporal subtraction to thereby yield a hybrid difference image as in FIG. 3 for every consecutive pair of low and high energy temporal difference images. In FIG. 5 the hybrid difference image data constituting image frames resulting from the entire exposure sequence are fed as they are produced by way of a bus 58 to one input of a multiplexer (MUX) 59 at the command of the operator. Each set of hybrid difference image data is switched through MUX 59 and fed by way of a bus 60 to a look-up table (LUT) 61 wherein gain and offset is applied to the image data or signals so that when the hybrid images are displayed one after another as commanded by the operator they will fill the dynamic range of the television monitor 62 on which they are displayed. After coming out of the LUT 61 on bus 63, the digitized hybrid difference image frames are fed to a DAC 64 wherein they are converted to analog video signals for being supplied by way of a cable 65 to TV monitor 62 for driving the monitor.

By the operator pressing a specified key on keyboard 26 the operator can bring about formation of first order hybrid difference images ($hD_i$) consecutively. As the data for each hybrid difference image is produced, the image is displayed on the screen 66 of television monitor 62 for inspection by the operator. Every hybrid difference image is numbered in sequence by computer 23 and this number is displayed with the image on the television monitor so the operator can identify it during his review of the images. Each time a hybrid image appears, the operator views it and determines whether or not it is free of artifacts or misregistration defects. During this review of the series of first order hybrid images, the operator presses keys on the operator terminal keyboard 26 to select or classify the image as to whether the image presently in view is sufficiently free of motion or misregistration artifacts to be used in the remasking process as a contribution to a new integrated pre-contrast or contrast-free mask or as a contribution to a new integrated post-contrast image or to be rejected if the image has artifacts or misregistration defects. The computer 23 responds to the selection by loading an identifier LUT 71 with the identification number of the image and codes it as to whether it is intended for use in an integrated non-contrast mask image or as a post-contrast image or a reject. Sometimes two, three or four images without visible contrast medium taken from either the pre-contrast or after post-contrast period or both and like numbers of post-contrast images may be selected for remasking. On the other hand there may be situations where all or nearly all, which means about 20 usually, of the pre-contrast and post-contrast first order hybrid images are usable.

Now, referring to FIG. 5, reprocessing of the hybrid difference images to achieve integrated remasking will be discussed. The series of alternate low and high temporal difference images data are still stored on video disk 36 following review and classification of the series of first order hybrid images. These data are accessed again and the sequence of hybrid images data is yielded at the output of ALU 57 as was the case when the first order hybrid images were formed for review as described above. In reprocessing or remasking, however, the hybrid images data are supplied to a bus 72 in FIG. 5. Only data for images that have been selected for remasking go on to this bus. There is a signal line 67 running out of identifier LUT 71 on which an inhibit signal appears when data for an image that has been selected for rejection appears. The inhibit signal acts on the circuit to prevent transmission of rejected data to bus 72. This bus is in a circuit with a pair of electronic switches 73 and 74. Switches 73 and 74 are individually electronically interlocked and are operated by a sequencer 75 that is controlled by signals transmitted over bus 76 from identifier LUT 71.

Switch 73 is for gating hybrid image data to an integrating circuit 77 and switch 74 is for gating hybrid image data to an integrating circuit 78. Integrating circuit 77, comprised of an ALU 79 and a frame memory 80, is for integrating preselected data representing no-contrast images or images that contain no contrast medium and are to be used as a mask. Integrating circuit 78, comprised of an ALU 81 and a frame memory 82, is for integrating the post-contrast images that have been pre-selected during the first order hybrid image review.

When the data for a selected non-contrast mask image is output from ALU 57, the identifier LUT 71 provides the signals for causing switch 73 to become conductive and feed the image data to ALU 79. This happens every time an identified non-contrast image is output from ALU 57. The first non-contrast image data in the series simply goes into ALU 79 and is transferred to a full frame memory FM3 which is also marked 80. These data stored in FM3 are coupled back by means of a bus 83 to one input of ALU 79. Thus, every time the data for a new selected non-contrast image is gated through switch 73, ALU 79 sums this data with the data stored in FM3 so that an integration of the pre-contrast images is finally accumulated in FM3.

Similarly, every time identifier LUT 71 effectuates conductivity of switch 74, a selected post-contrast image is supplied to one input of ALU 81 for being summed or integrated with the previous post-contrast images data that are stored in memory 82 or FM4. A bus 84 couples the output of FM4 to one input of ALU 81 so that the previously stored and integrated images data can be added to the data coming through switch 74.

At this time, the contrast-free or non-contrast integrated mask image data are stored in FM3 and the post-contrast integrated image data are stored in FM4. It is possible that, during the review of the first order hybrid subtraction images, different numbers or quantities of post-contrast and contrast-free images were selected. Hence, the brightness levels or intensities of the images integrated in FM3 and FM4 may differ so they must be normalized. Information concerning the number of non-contrast images selected for the integrated mask and the number of post-contrast images is stored in computer 23. The computer thus determines the proper scaling factors by which the data in FM3 and FM4 must be multiplied in a pair of MULTs 85 and 86 to bring about normalization. The computer determines the scale factor $x_1$ by which the data from FM3 must be multiplied in MULT 85 to bring about normalization and it similarly determines the factor $x_2$ by which the post-contrast integrated hybrid image in FM4 must be multiplied in MULT 86. $X_1$ is proportional to the reciprocal of the number of mask images integrated in FM3. $X_2$ is proportional to the reciprocal of the number of post-contrast images that have been integrated in FM4.

When the non-contrast and post-contrast integrated hybrid images have been scaled in MULTs 85 and 86, respectively, these data become inputs by way of buses 87 and 88 to an ALU 89. In ALU 89 the new integrated hybrid mask image data coming in on bus 87 is subtracted from the hybrid post-contrast integrated image data to produce a single final set of hybrid difference image data which are output on a bus 90. These data are also stored in a memory 91 for future use. The difference image data on bus 90 is fed to an input of MUX 59 where it is switched through to bus 60 for further processing in gain and offset LUT 61 and reconversion to analog video singals in DAC 64 for driving the television monitor 62 to display the final integrated remasked hybrid difference image. The blood vessel of interest appearing on the screen is marked 11' and is defined by the contrast medium in its interior. Bone, stable and moved soft tissue and the effects of noise have all been substantially cancelled out and only the data representative of the contrast medium remains in the final data set.

One of the merits of the system and method just described is that when the series of first order hybrid images are being formed for review the energy subtraction step can be modified to bring about cancellation of anything that differs between the low energy temporal difference images and the high energy temporal difference images that are subtracted in pairs to produce the first order hybrid images for review. Recall that when frame after frame of hybrid difference image data is being formed, the low energy temporal difference images are multiplied by weighting coefficient $k_L$ in MULT 53 and the high energy temporal difference images are multiplied by weighting coefficient $k_H$ in MULT 54. In accordance with the invention, the operator can use the keyboard 26 on the operator terminal 24 to instruct the computer 23 to supply by way of bus 27 different valued $k_L$ or $k_H$ coefficients while an image is under review so that the operator can look at the TV display screen and adjust one or both of these coefficients to maximize cancellation of everything that is similar in the low and high energy temporal difference images. The same values of $k_L$ and $k_H$ is then used for forming the hybrid images that are used in the integrated remasking process.

During the first operating mode just described high and low energy temporal difference images were formed and stored on video disk 36 concurrently with the acquisition of the successive images resulting from the exposure sequence. In a second mode of operation energy difference or energy subtracted images data are formed concurrently with image acquisition and these energy difference images are stored on video disk 36 for subsequent reprocessing. The exposure sequence for the second mode can be the same as in the first mode illustrated in FIG. 1 where the first pre-contrast low x-ray energy exposure is designated $L_0$ and the first high energy x-ray exposure in the closely successive pair of exposures is designated $H_0$. In this mode the data for $L_0$ are subtracted from the data for $H_0$ and the resulting energy difference image, ED, is stored on disk 36. As indicated in FIG. 4, the first energy difference image is designated $ED_0$. Likewise, the image data for $L_1$ in FIG. 1 is subtracted from $H_1$ to produce the energy difference image $ED_1$ data in FIG. 4 and it is stored. Similarly, every successive low energy image and high energy image data in a pair throughout the precontrast period and the post-contrast period and the afterpost-contrast period to and even beyond $L_E$ and $H_E$ pairs in FIG. 1 are subtracted and the resulting energy difference images $ED_0$ to $ED_N$ are stored on disk. Referring to FIG. 5, the mechanics of acquiring the energy difference images involves temporarily storing the low energy image data in an exposure pair in memory FMA. The high energy image data in a pair is transmitted through DEMUX 30 to processor 32 in which the low energy data in FMA is subtracted from the current high energy image data in the pair. Before each subtraction occurs, however, the low energy image data are multiplied in processor 32 by a weighting coefficient $k_L$ and the high energy image data in a pair are multiplied by a coefficient $k_H$. The result of this weighting and subtraction process is to bring about cancellation of the data representative of soft tissue in the image and to let bone and contrast medium, if any, remain. Assume now that the exposure sequence has been completed and the data for the series of energy difference images from $ED_0$ to $ED_N$ are stored on separate tracks of video disk storage 36. The operator then undertakes a review of the energy difference images to select artifact-free non-contrast and post-contrast energy difference images and to identify those that have artifacts and are to be rejected as in the previously described mode.

In the second mode now under discussion, in a reprocessing procedure, the energy difference images video signal data sets are accessed from disk 36 one at a time and converted to digitally represented images in ADC 46. In this case, however, since the low and high energy images data were weighted before subtraction and storage it is not necessary to perform another energy subtraction in the circuits comprised of FM1, MULT 53 and ALU 57 and FM2 and MULT 54 and ALU 57. However, the simple hybrid images must be formed for review. This is done by storing the first energy subtraction image in FM1 and using it as a mask image. Each subsequent energy difference is stored after digitization in FM2. A temporal subtraction between it and the mask image in FM1 is performed in ALU 57 and the resultant simple hybrid image is sent to one input of MUX 59. After the MUX, gain and offset is applied to the data in LUT 60, converted to analog video signals in DAC 64 and displayed on the screen 66 of television monitor 62. The operator then reviews the hybrid difference images one after another and decides whether they should be classified as suitable contrast medium-free images which are candidates for a new mask which will be produced in the remasking and reprocessing procedure which is to follow. The operator similarly identifies any post-contrast images that are suitable for use in the integrated remasking process as a new post-contrast image. Likewise, some of the hybrid difference images resulting from exposures in the after post-contrast period may be candidates for integrating to produce a new mask. The frame or image identification information is transmitted to the identifier LUT 71 under the control of computer 23 as in the previous case. After the images are reviewed, conditions are now in order for performing integrated remasking.

The energy difference images data are then successively accessed from video disk storage 36 and digitized again in ADC 46. The circuit components between input bus 48 and output bus 72 in FIG. 5 are again deactivated for transmission of data from input to output on a one-to-one basis or without alteration. Then, as the energy difference images data are accessed from disk storage, electronic switch 73 switches the contrast-free or non-contrast mask image data candidates into integrating circuit 77 and selectively operated electronic switch 74 switches the post-contrast images that have been selected by the operator into integrating circuit 77. The coaction of ALU 79 and frame memory FM3 to bring about integration of the contrast-free images in integrating circuit 77 is the same as in the first described mode. Likewise, ALU 81 and FM4 cooperate in the same way to effect integration of the post-contrast images. Again, it may be that the numbers of post-contrast images data are different than the numbers of non-contrast medium images data so the integrated data in the respective memories FM3 and FM4 might have to be scaled in MULTs 85 and 86 to effect normalization as previously described. After normalization the integrated contrast-free images data are fed to one input of ALU 89 and the contrast-containing integrated images data are sent to the other input of ALU 89. The contrast-free image data are subtracted from the contrast-containing image data in ALU 89 and a single set of image data becomes output on a bus 90. The subtraction process in ALU 89 is actually a temporal subtraction process in that an integrated mask is being subtracted from an integrated post-contrast image data set. This temporal subtraction process results in cancellation of the data representing bone in the final hybrid image data set and it lets the data representative exclusively of the contrast medium in the blood vessel remain. The final hybrid image data set that is output from ALU 89 is stored in a memory 91 and it is also sent by way of bus 90 through MUX 59 where it undergoes conditioning in the subsequent circuitry including LUT 61 and 64 for ultimately becoming analog video signals on cable 65 for driving TV monitor 62 and display of the final hybrid image on the screen of television monitor 62.

In the two modes of operation described thus far, either temporal difference images were put in storage during image acquisition or weighted energy subtracted images were put in storage. As a third mode of operation it is also contemplated to put the raw unsubtracted image data resulting from the alternate low and high energy exposures illustrated in FIG. 1 in disk storage so that the raw image data will be available at any time to allow the options of forming a series of temporal difference images first or energy difference images first. Storing the raw data has some advantage in the mode where energy difference images are formed before temporal subtraction occurs in that one may adjust the coefficients $k_L$ and $k_H$ to optimize cancellation of soft tissue when the first order hybrid images are being formed or during reprocessing when the images selected during the review are being integrated.

In this third mode of operation, prior to forming integrated remasked images, it is necessary to form a sequence of first order hybrid images. This is done by first reading out the first low and high energy unsubtraced images from video disk 36 and storing these data in memories FM1 and FM2, respectively. Energy subtraction between these two images is next performed, using MULTs 53 and 54 and ALU 57 and the resulting energy subtracted mask image is next stored in memory FM4. The process is repeated for the next exposure pair but the result is stored in memory FM3. Next, temporal subtraction is performed by subtracting the contents of FM3 from FM4 in ALU 89 and the result is amplified, converted into analog format and displayed on TV monitor 62. This resulting first order hybrid image and the entire sequence of such images can be formed and displayed by repeating this process for subsequent exposure pairs again using the image in FM4 as the energy subtracted mask image. The process of reviewing first order hybrid images and classifying them in non-contrast, post-contrast and discard categories and integrating the remask result is done as in the previously described modes.

In a fourth mode of operation, hybrid images are formed during the image acquisition or exposure sequence. In this mode, the first low and high energy images are used as mask images and are stored in memories FMC and FMD in the left portion of FIG. 5. The input and output buses for FMC are marked 41 and 42, respectively, and the input and output buses for FMD are marked 43 and 44, respectively. The second exposure pair comprised of a low and a high energy image are stored in memories FMC and FMD, respectively. A hybrid image is subsequently formed from these four images in memories FMA to FMD by using processor 32. Each pair of images are temporally subtracted first and then weighted and energy subtracted or, optionally conversely, weighted and energy subtracted first and then temporally subtracted. By way of example, if the option to do temporal subtraction first is exercised, the low energy mask image data in FMA would be subtracted from the next low energy exposure data in FMC to produce a temporal difference image and this would be reloaded momentarily back in FMC. Likewise, the high energy mask image data in FMB would be subtracted from the next high energy exposure data in FMD to produce a high energy temporal difference image and reloaded back into FMD. The resulting low and high energy temporal difference images would then be multiplied in processor 32 by weighting coefficients $k_L$ and $k_H$ and, after weighting, the results would be subtracted from each other to produce the hybrid difference image data which would be converted to analog video format in DAC 34 and stored on video disk 36. The process of subtracting the low energy mask and high energy mask from each respective low and high energy subsequent exposure, weighting and subtracting would be repeated for producing the data representative of a whole series of hybrid images. It is assumed that those skilled in the art will know from the discussion thus far how to exercise the option of forming the hybrid images data by weighting and performing energy subtraction first and following this with temporal subtraction and storage on disk. In any case, the series of first order hybrid difference images data taken from disk storage can be displayed and reviewed after redigitizing these images data in ADC 46 and storing the data successively in memory FM1, for example. These data can next be displayed by passing the data without alteration through MULT 53, ALU 57 and through MUX 59 and out to TV monitor 62. All hybrid images are displayed in succession in similar fashion and reviewed for classification as non-contrast-containing images, post-contrast images and rejects prior to undertaking the integrated remasking operation as has been described heretofore.

As indicated earlier, at least enough low and high energy exposure pairs will be obtained over the pre-contrast, post-contrast and after post-contrast periods to provide at least about 20 hybrid difference images before integrated remasking reprocessing is undertaken. Making pairs of low energy and high energy exposures in the range of 1–5 or 6 per second will be appropriate. In any case, enough exposure pairs should be made for there to be a statistical probability of having more than one pre-contrast or after post-contrast type of non-contrast image and more than one post-contrast image that is determined to be free of artifacts during the review. Generally, the number of exposures in the sequence will be inversely proportional to the magnitude of the x-ray tube current so that in all cases the x-ray dosage to the patient will be about the same and not excessive.

Making the sequence of alternate low and high energy x-ray exposure pairs as illustrated in FIG. 1 and scanning or reading out of the TV camera 17 image target after each exposure can be variously timed for the ultimate objective of integrated remasking. Some timing relationships are suggested in parts 6A to 6D of FIG. 5 wherein x-ray pulse widths for low and high energy exposures and TV camera target readout are plotted as a function of time.

In part 6A the low energy exposure is marked L and has a duration of two television frame times. The low energy x-ray beam pulse may occupy less than two full TV frame times if desired. Similarly, the actual high energy x-ray pulse width may be less than the one frame time shown. Regardless of x-ray pulse width, the time from the start of an exposure to video signal or TV camera target readout following an exposure is generally some integral number of TV frame times. This allows for exposure times longer than those shown in part 6A of FIG. 6. In a 60 Hz television system each frame time equals 1/30 of a second and in a 50 Hz system each frame time equals 1/25 of a second. In the given 60 Hz system example, in part 6A of FIG. 6, one frame time 95 is allowed for TV camera target readout after the low energy exposure, as indicated by the analog video signal marked L in the line designated TV readout. During the frame following low energy image readout, a high energy exposure, H, is made and this is followed by TV camera readout during the frame time 96. The TV camera image target is read out in the progressive scan mode in the illustrated embodiment but the interlaced scan mode could be used. The chosen x-ray tube current and, hence, x-ray beam intensity for the low and high energy exposures depends on a number of factors that are known to those familiar with x-ray technology.

Figure 6:
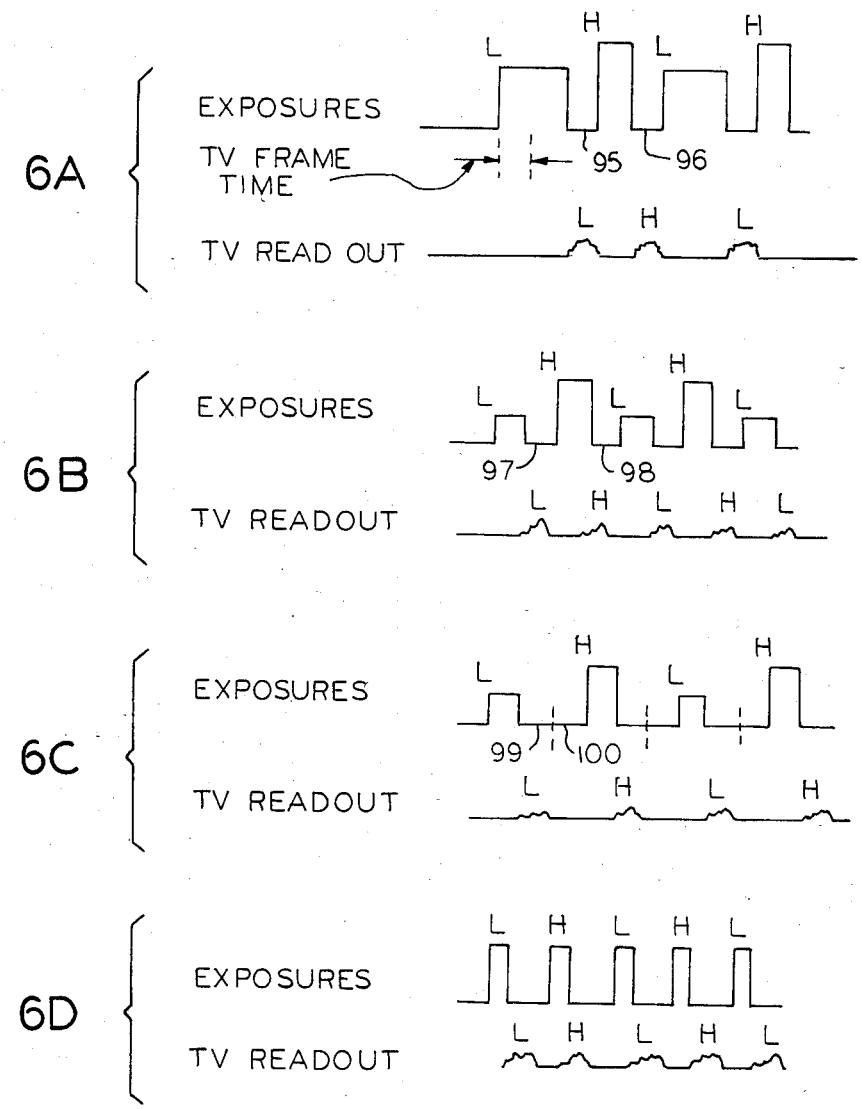
FIG. 6, comprised of parts 6A–6D, shows several different timing diagrams for the low and high x-ray energy exposures in relation to the television camera readout procedures.

For any of the timing relationships in parts 6A–6D of FIG. 6, the kVp applied to the x-ray tube anode is preferably in the range of 65–85 kVp for the low energy exposures and in the range of 125–135 kVp for the high energy exposures.

In part 6A of FIG. 6 just described, each combination of successive low and high energy exposures in a pair of readouts allows formation of one energy difference or energy subtracted image. Each pair uses five television frame times or 5/30 of a second so if desired a maximum of 6 energy difference images per second are attainable. Note that the time between low energy and high energy x-ray pulses is as short as is permissible so that there is unlikely to be significant voluntary of involuntary tissue movement between the exposures in a low and high energy pair. In general, the exposure rate should be high enough to permit at least one but preferably more difference images per second.

Part 6B of FIG. 6 shows a timing sequence that has been used and may be considered a preferred timing sequence. The low and high energy exposures are marked L and H, respectively. One television frame time is allotted for each exposure although the duration of an exposure may be shorter than a frame time. TV camera progressive scan or target readout is performed during the single frame times 97 and 98 following the low and high energy frame times. This timing permits obtaining 7.5 energy subtracted or energy difference images per second.

Part 6C of FIG. 6 shows another timing sequence. Here, the low energy exposure, L, is made during a single television frame time and the high energy exposure, H, is made two frame times after the low energy exposure. During the first frame time 99, for example, after a low and a high energy exposure also, the TV camera target is read out in the progressive scan mode. During the next frame time 100 but before the subsequent high energy exposure the TV camera target is scanned with the electron beam to scrub any residual signal from the previous exposure. This ensures that any residual image from the low energy exposure is not read out. Similarly, the target may be scrubbed after each high energy exposure. Some TV camera targets are laggy and require scrubbing. Each combination of successive low and high energy image readouts still forms one energy difference image. The part 6C timing format limits the number of available energy difference images to five per second in a TV system wherein a frame time is 1/30th of a second.

Part 6D of FIG. 6 shows another timing format wherein the low, L, and high, H, energy exposures are of very short duration and are made during retrace time between successive television frames. Readout of the TV camera target is done during the frame times following each retrace period as shown in the line labelled TV readout in FIG. 6D. This format permits obtaining as high as 15 energy difference images per second but because of the shortness of the retrace time and the high number of images it taxes the data handling capability of presently available data processing and data storage devices.

Exposure intervals other than those shown in parts 6A–6D of FIG. 6 are also permitted. For example, one could use a scrub frame 100 as in part 6C only following the high energy exposure target readout 99 and not use a similar scrub frame subsequent to the low energy exposure readout. In this case, if both the low and high energy x-ray pulse widths were less than one frame time then a rate of six energy subtracted images per second would be allowed.

A fifth mode of integrated remasking is within the purview of the invention and can also be practiced with the apparatus shown in FIG. 5. In this fifth mode no hybrid image subtraction is performed at any time which means that only an x-ray beam having one energy level is required for making the sequence of exposures. Generally, a potential in the range of 65–85 kilovolts is applied to the anode of the x-ray tube for making the exposures. This single kilovoltage and resulting average energy level is permitted because there will be no requirement to perform energy subtraction nor to make hybrid difference images in the temporal image integrated remasking mode now to be discussed. All that is required is to make a sequence of exposures with the same x-ray energy at a rate comparable to the rate at which the dual energy exposures are made in FIG. 1. The constant x-ray energy exposure sequence is made throughout the pre-contrast, post-contrast and after post-contrast periods as in the previous modes. The first pre-contrast exposure corresponding to $L_0$ in FIG. 1 is used as a mask image. The data representative of the mask image is subtracted from the data representative of each subsequent similar energy exposure throughout pre-contrast, post-contrast and after post-contrast periods in the sequence to thereby provide a series of temporal difference images data. Relating this to FIG. 5, the initial mask image may be stored in FMA at the beginning of the sequence. As the subsequent exposures in the sequence occur, their data are fed directly into processor 32 wherein the mask image data are subtracted from the present or live image data to thereby produce the series of temporally subtracted image data sets which are consecutively converted in DAC 34 to analog video signals in the described embodiment and stored on separate tracks of video disk storage device 36 . Thus, video disk 36 will hold a series of temporally subtracted temporal difference (TD) images from 1 to N. These temporal difference images result from subtracting the mask image data M and the consecutive images, I, in the exposure sequence.

As a preliminary to performing integrated remasking in this fifth mode, the data for the respective temporal difference images are accessed from disk digitized in ADC 46 and transmitted without alteration from bus 48 to bus 58, that is, on a one-to-one basis. Bus 58 feeds into MUX 59 which is switched to send the images data through the gain and offset LUT 61 and then to the DAC 64 for conversion to analog video signals to enable display and individual review of the successive stored temporal difference images on the screen 56 of television monitor 62.

Again, the operator reviews all of the temporal difference images, one after another, and decides which of the pre-contrast and after post-contrast non-contrast types of temporal difference images are candidates for a new integrated mask image and which are candidates for an integrated post-contrast image and which are to be rejected. Through the action of the operator, the selected images are identified in accordance with their classification and the identification information is stored in identifier LUT 71 as in the previous cases. Again, some times all or nearly all of the pre-contrast and post-contrast and after post-contrast temporal difference images will be useful for forming an integrated mask and an integrated post-contrast image. More frequently, there will be 3, 4, 5 or 6 pre-contrast and post-contrast integration candidates although there may be different numbers of temporal difference images in the pre-contrast or contrast-free and the post-contrast classes.

When the identifier LUT 71 is loaded with the image identification data, reprocessing or remasking can be initiated. In reprocessing, the series of temporal difference images are accessed from video disk storage 36 and digitized in ADC 46. The digital images data are then fed in series through bus 48 to bus 72 without alteration in the circuitry intervening between bus 48 and bus 72.

Each time image data that has been selected in the review for composing an integrated mask comes through, sequencer 75 under control of identifier LUT 71 causes switch 73 to conduct to supply the data to ALU 79. Likewise, each time data for a post-contrast image that has been selected for integration comes through, the sequencer 75 causes switch 74 to conduct to feed these data to one input of ALU 81.

ALU 79 coacts with FM3 to effect an integration of all of the contrast-free or non-contrast image data sets that are intended for use as a new mask. ALU 81 coacts with FM4 to integrate the post-contrast images data that have been selected in the temporal difference image review. The integrated contrast-free image data set then arrives in MULT 85 and the integrated post-contrast image data set arrives in MULT 86 for being multiplied, respectively, by scaling factors $x_1$ and $x_2$ for the purpose of normalizing the intensity of the images if the number of contrast-free temporal difference images is different than the number of post-contrast temporal difference images. Following normalization of the integrated images, they are fed to each of the inputs of ALU 89 wherein the mask image data set is subtracted from the post-contrast image data set to yield a new and final temporal difference image data set that is fed out on bus 90 and also into memory 91. The data on bus 90 are switched through MUX 59, have gain and offset added in LUT 61 and are converted to analog video signals in DAC 64 for display of the final temporal difference image which exhibits only the contrast medium containing blood vessel 11' on the screen of television monitor 62.

A sixth mode of integrated remasking is also within the scope of the invention and, like the fifth mode, pertains to temporal rather than hybrid subtraction. In this sixth mode, a sequence of single x-ray energy exposures is made but the unsubtracted images rather than difference images are stored on disk 36. In other words, the mask image data and the data for all subsequent images are stored on disk as they are acquired. Next the first order temporal images are formed. This is done by storing the first unsubtracted image data in memory FM1 and using it as mask image data. The next unsubtracted image data, that is, the data resulting from the next x-ray exposure in the sequence is stored in memory FM2 and the difference between the data in FM2 and FM1 is obtained by using ALU 57 to perform the subtraction and produce a temporal difference image data set. Each time a temporal difference image data set is determined, the result is sent by way of bus 58 and MUX 59 to gain and offset LUT 61 and it is amplified, converted to analog video format in DAC 64 and displayed on TV monitor 62. All subsequent unsubtracted images are also stored in FM2, subtracted from the mask that resides in FM1 and displayed in similar fashion using the method described heretofore. The operator again classifies the temporal difference images as to whether they are suitable to integrate into a new non-contrast containing mask or a new post-contrast integrated image or as a reject as previously described.

Although various implementations of the integrated remasking method and different modes of practicing it have been described in detail, such description is intended to be illustrative rather than limiting. The scope of the invention is to be limited only by construing the claims which follow.

We claim:

1. An integrated remasking method of producing data representative of an x-ray image of a blood vessel in a region of a body in a subtraction angiography procedure, the method comprising the following steps:
repeatedly expose said body region containing said vessel to a low energy x-ray beam and a high energy x-ray beam in pairs and in either order during at least one of two periods, namely, a pre-contrast period when an x-ray contrast medium that has been introduced into said body has not yet arrived in said vessel and a period during which said medium has departed from said vessel, said periods being defined as non-contrast periods and the resulting images as non-contrast images, and maintaining said exposures during an intervening period when said medium is present in said vessel defined as the post-contrast period and the resulting images as the post-contrast images,
convert the sequence of non-contrast and post-contrast x-ray images thus produced at high and low energy to data representative of the images,
select the data for one of the low energy exposure images obtained during a non-contrast period as the low energy mask image data and select the data for one of the high energy exposure images obtained during a non-contrast period as the high energy mask image data,
subtract the low energy mask image data from the respective data for the low energy exposure images in the sequence and subtract the high energy mask image data from the data for the high energy exposure images in the sequence to thereby provide a series of low energy temporal difference images data and a series of high energy temporal difference images data,
perform energy subtraction comprising multiplying each of said low energy temporal difference images data, respectively, by a weighting coefficient and multiply each of said high energy temporal difference image data next to the low energy temporal difference image data in the series respectively by a different weighting coefficient and subtract the low energy temporal difference image from the high energy temporal difference image data, respectively, to thereby provide a series of first order hybrid difference images data extending over at least one of the non-contrast periods and over the post-contrast period, display one after another of the images that correspond to the first order hybrid difference images data and observe the images for identifying and selecting those first order hybrid non-contrast images that are of suitable quality to be used for forming new integrated mask image data and those post-contrast images that have contrast medium in them and are suitable for forming new integrated post-contrast image data, integrate the sequence of first order hybrid difference images data corresponding to the hybrid difference images that have been identified as usable to form the new mask image data and separately integrate the sequence of hybrid difference images data corresponding to the hybrid difference images that have been identified as usable to form new post-contrast image data, multiply the image data resulting from at least one of the two integrations by a scaling coefficient to normalize the brightness levels of the data in those cases where the number of images selected for the new integrated mask image differs from the number selected for the new post-contrast image and do not multiply by a scaling coefficient if the number of mask images and post-contrast images selected are equal, and subtract the integrated mask hybrid image data and the integrated hybrid post-contrast image data to produce final data which contains only the data representative of an image of the contrast medium in said blood vessel.

2. An integrated remasking method of producing data representative of an x-ray image of a blood vessel in a region of a body in a subtraction angiography procedure, the method comprising the following steps:

repeatedly expose said body region containing said vessel to a low energy x-ray beam and a high energy x-ray beam in pairs and in either order during at least one of two periods, namely, a pre-contract period when an x-ray contrast medium that has been introduced into said body has not yet arrived in said vessel and an after post-contrast period during which said medium has departed from said vessel, said periods being defined as non-contrast periods and the resulting images as non-contrast images, and perform said exposures during an intervening period when said medium is present in said vessel defined as the post-contrast period and the resulting images as the post-contrast images, convert the sequence of x-ray images thus produced at high and low energy to data representative of the images, store the data for one of the low energy exposure images obtained during a non-contrast period as the low energy mask image data and store the data for one of the high energy exposure images obtained during said period as the high energy mask image data, for every other low and high energy exposure in the sequence subtract the low energy mask image data from the image data resulting from each low energy exposure and alternately subtract the high energy mask image data from the image data resulting from each high energy exposure and store the resulting series of alternate low and high energy temporal difference images data, repeatedly access from storage concurrently the data for one low energy temporal difference image and the data for one high energy temporal difference image that is next to it in the series and multiply the low energy temporal difference images data by one weighting coefficient and multiply the high energy temporal difference images by a different weighting coefficient, repeatedly subtract the low energy weighted temporal difference data and the high energy weighted temporal difference image data next to it in the exposure sequence to thereby produce a series of hybrid images data, display the images represented by the series of hybrid images data one after another as they are produced for enabling identification and selection by visual observation those non-contrast images that are suitable for forming new integrated mask image data and those post-contrast images that have contrast medium in them and are suitable for forming new integrated post-contrast image data, then re-access successive pairs of low and high energy temporal difference images data from storage and reproduce hybrid difference images data again by performing the steps previously set forth, integrate the reproduced hybrid difference images data corresponding to the hybrid difference images that have been identified as usable to form the new mask image data and separately integrate the hybrid difference images data corresponding to the hybrid difference images that have been identified as usable to form new post-contrast image data, multiply the image data resulting from at least one of the two integrations to normalize the brightness levels of the data in those cases where the selected number of images selected for the new integrated mask image differs from the number selected for the new post-contrast image and do not multiply by a scaling coefficient if the number of mask images and post-contrast images selected are equal, and subtract the integrated mask image data and the integrated post-contrast image data to produce a final data set which contains only the data representative of an image of the contrast medium in said blood vessel.

3. The method in accordance with any of claims 1 or 2 including the step of:

varying the value of selected ones of said weighting coefficients by which said low and high energy temporal difference images are being multiplied as aforesaid while the image corresponding to the resulting hybrid image data is being displayed and continuing said varying until cancellation of motion or other artifacts remaining in the pairs of low and high energy temporal difference images such that only contrast medium in the hybrid image remains after said energy subtraction.

4. The method in accordance with any one of claims 1 or 2 including the step of amplifying logarithmically the data representative of the images resulting from the low and high energy exposures as the respective image data are acquired.

5. An integrated remasking method of producing data representative of an x-ray image of a blood vessel in a region of a body in a subtraction angiography procedure, the method comprising the following steps:

repeatedly expose said body region containing said vessel to a low energy x-ray beam and a high energy x-ray beam in pairs and in either order during two periods, namely, a pre-contrast period during which an x-ray contrast medium that has been introduced into said body has not yet arrived in said vessel and an after-post-contrast period during which said medium has departed from said vessel, said periods being defined as non-contrast periods and the resulting images as non-contrast images, and also performing said pairs of exposures during an intervening period when said contrast medium is present in said vessel defined as the post-contrast period and the resulting images as the post-contrast images, convert the sequence of x-ray images thus produced at high and low energy exposures to data representative of the respective images, repeatedly throughout the sequence multiply the data representative of an image acquired with each low energy exposure in each pair by a weighting coefficient and multiply the data representative of an image acquired with each high energy exposure in the same pair by a weighting coefficient and subtract the weighted high energy images data from the low energy weighted images data composing the pair to yield a series of energy difference images data comprised of non-contrast and post-contrast images, store said series of energy difference images data, sequentially access from storage said energy difference image data and subtract them from the first energy difference image data in the sequence which serves as a mask to thereby produce a sequence of hybrid images data, display the images represented by the hybrid image data one after another as they are produced for enabling by visual observation of the images, identification and selection of those non-contrast images that are suitable for forming new integrated mask image data and those post-contrast images that have perceptible contrast medium in them and are suitable for forming new integrated post-contrast image data, integrate the energy difference image data that have been identified and selected as being usable to form a new mask image data and separately integrate the energy difference image data that have been selected as being usable to form new post-constrast image data, multiply the image date resulting from at least one of the two integrations by a coefficient to normalize the brightness levels in those cases where the number or images selected for the integrated mask image differs from the number selected for the integrated post-contrast image and do not multiply by a coefficient if the number of images selected for the integrated mask and integrated post-contrast image are equal, and subtract the integrated mask image data and the integrated post-contrast image data to achieve hybrid subtraction and produce final data which contains the data representative of an image of the contrast medium in the vessel.

6. The method in accordance with claim 5 including the step of amplifying logarithmically the data representative of the images resulting from the low and high energy exposures as the data are aquired.

7. An integrated remasking method of producing data representative of an x-ray image of a blood vessel in a region of a body in a subtraction angiography procedure, the method comprising the following steps:

repeatedly expose said body region containing said vessel to a low energy x-ray beam and a high energy x-ray beam in pairs and in either order during two periods, namely, a pre-contrast period during which an x-ray contrast medium that has been introduced into said body has not yet arrived in said vessel and an after post-contrast period during which said medium has departed from said vessel, said periods being defined as non-contrast periods and the resulting images an non-contrast images, and perform said pairs of exposures during an intervening period when said medium is present in said vessel defined as the post-contrast period and the resulting images as the post-constrast images, convert the sequences of x-ray images as they are acquired at high and low energy to data representative of the respective images and store these images data, access from storage the data for one of the low energy exposure images obtained during the pre-contrast period as the low energy mask image data and access the data for one of the high energy exposure images obtained during said period as the high energy mask image data, subtract the low energy mask image data from the respective successive low energy exposure images in the sequence and subtract the high energy mask image data from the data for the respective successive high energy exposure images in the sequence to thereby provide a series of low energy temporal difference images data and a series of high energy temporal difference images data, perform energy subtraction by the steps of multiplying any low energy temporal difference image data by a weighting coefficient and multiplying the high energy temporal difference image data in the same exposure pair as said low energy temporal difference image data by a different weighting coefficient and subtract the data resulting from one multiplication from the data resulting from the other multiplication and by repeating these steps for each pair of low energy and high energy temporal difference images provide a series of first order hybrid difference images data extending over at least the pre-contrast and post-contrast periods, displaying one after another of the images that correspond to the first order hybrid difference images data for identifying and selecting, by visual observation, those non-contrast images that are suitable for forming a new integrated mask image and those post-contrast images that are suitable for forming a new integrated post-contrast image, integrating the first order hybrid difference images data corresponding to the hybrid difference images that have been identified and selected as usable to form the new mask image data and separately integrating the hybrid difference images data corresponding to the hybrid difference images that have been identified and selected as usable to form new post-contrast image data, multiply the image data resulting from at least one of the two integrations by a scaling coefficient to normalize the brightness levels of the data in those cases where the selected number of images selected for the new integrated mask image differs from the number selected for the new post-constrast image and do not multiply by a scaling coefficient if the numbers of images composing the new integrated mask image and the new integrated post-contrast image are equal, and subtract the integrated mask image data and the integrated post-contrast image data to produce final image data which contains only the data representative of an image of the contrast medium in said blood vessel.

8. The method in accordance with claim 7 including the step of amplifying logarithmically the data resulting from the low and high energy exposures as the respective images data are acquired.

9. The method in accordance with any one of claims 7 or 8 including the step of varying the value of the weighting coefficients by which said low and high temporal difference images are being multiplied while the image corresponding to the resulting hybrid difference image is being displayed and by visual observation of the displayed images choosing for final use the weighting coefficients that result in cancellation of motion of other artifacts found in a pair of low and high energy temporal difference images so that only the data representative of said contrast medium that defines the interior of the blood vessel remains after energy subtraction.

10. An integrated remasking method of producing data representative of an x-ray image of a blood vessel in a region of a body in a subtraction angiography procedure, the method comprising the following steps:

repeatedly expose said body region containing said vessel to a low energy x-ray beam and a high energy x-ray beam in pairs and in either order during at least one of two periods, namely, a pre-contrast period during which an x-ray contrast medium that has been introduced into said body has not yet arrived in said vessel and an after-post-contrast period during which said medium has departed from said vessel, said periods being defined as non-contrast periods and the resulting images as non-contrast images, and performing said pairs of exposures during an intervening period when said medium is present in said vessel defined as the post-contrast period and the resulting images as the post-contrast images, convert the sequence of x-ray images resulting from the exposures at high and low energy to data representative of the respective images, form a series of images data representative of hybrid difference images by performing the steps of selecting one of the low energy non-contrast images data as the mask image data and subtract the mask image data from each subsequent low energy image data in the exposure sequence and select one of the high energy non-contrast images data as the high energy mask image data in the same exposure pair as the low energy mask and subtract the high energy mask image data from each subsequent high energy images data in the exposure sequence to thereby provide for producing a series of alternate low energy temporal difference images data and high energy temporal difference images data, multiply the low energy temporal difference images data and the high energy temporal difference images data in the same exposure pairs as they are produced by different weighting coefficients, respectively, and subtract the weighted images data to produce a series of hybrid difference images data and store each hybrid image data as it is produced, access from storage one after another of the hybrid difference images data and use these data to effect a display of the corresponding hybrid images for selection by visual inspection of the displayed images, and identification of those non-contrast hybrid images which are of suitable quality for forming a new integrated mask and those post-contrast hybrid images that are suitable for forming an integrated post-contrast image, integrate the hybrid difference images corresponding to those that have been selected to form the new mask and separately integrate those that have been selected to form a new post-contrast image, and subtract one resulting integrated image data from the other to yield a final image data that contains only the data representative of the contrast medium in said vessel.

11. The method in accordance with claim 10 wherein said series of hybrid image data are formed by the multiplying the images data resulting from the first non-contrast low energy exposure by a weighting coefficient and multiplying the images data resulting from the non-contrast high energy exposure in the same pair of exposures by a weighting coefficient and subtracting one of the weighted images data from the other to produce an energy subtraction mask image data, and multiplying the images data resulting from each subsequent low energy exposure by a weighting coefficient and multiplying the images data resulting from the high energy exposure in the same pair of exposures by a different weighting coefficient and subtracting one of the weighted images data from the other to produce a second energy subtraction image data, subtracting said second energy subtraction data from said energy subtraction mask image data to produce a hybrid image data for storage, and repeating the last-mentioned weighting and subtracting steps for all of the low and high energy exposure pairs in said sequence.

12. The method in accordance with any one of claims 10 or 11 wherein the data representative of the respective images resulting from the x-ray exposures are amplified logarithmically as these data are acquired and before performing the steps for producing the hybrid images data.

* * * * *